US008693837B2

(12) United States Patent
Tischler et al.

(10) Patent No.: US 8,693,837 B2
(45) Date of Patent: Apr. 8, 2014

(54) HIGH RESOLUTION NEAR FIELD SCANNING OPTICAL MICROSCOPY

(75) Inventors: Jonathan R. Tischler, Sharon, MA (US); Michael Scott Bradley, Cambridge, MA (US); Vladimir Bulovic, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 831 days.

(21) Appl. No.: 12/531,960

(22) PCT Filed: Mar. 19, 2008

(86) PCT No.: PCT/US2008/057426
§ 371 (c)(1),
(2), (4) Date: May 12, 2010

(87) PCT Pub. No.: WO2008/115950
PCT Pub. Date: Sep. 25, 2008

(65) Prior Publication Data
US 2010/0306888 A1 Dec. 2, 2010

Related U.S. Application Data

(60) Provisional application No. 60/895,875, filed on Mar. 20, 2007.

(51) Int. Cl.
*G02B 6/00* (2006.01)
*G01Q 60/18* (2010.01)

(52) U.S. Cl.
USPC ............................................. 385/141; 850/30

(58) Field of Classification Search
USPC ................................................ 850/30; 385/141
See application file for complete search history.

(56) References Cited

U.S. PATENT DOCUMENTS

| 5,448,055 | A | | 9/1995 | Nakamura et al. |
| 5,770,856 | A | * | 6/1998 | Fillard et al. ................. 250/234 |
| 5,789,742 | A | * | 8/1998 | Wolff ...................... 250/227.11 |
| 6,746,582 | B2 | * | 6/2004 | Heller et al. ............ 204/403.06 |
| 2006/0159901 | A1 | | 7/2006 | Tischler et al. |

* cited by examiner

*Primary Examiner* — Omar Rojas
(74) *Attorney, Agent, or Firm* — Steptoe & Johnson LLP

(57) ABSTRACT

An optical fiber including a surface including a non-covalent multilayer including a light-absorbing material can be used to develop fluorescence microscopy with a lateral resolution of about 5 nm and possibly lower. The non-covalent multilayer can be a highly absorptive thin film, for example a film based on J-aggregates, which can be used with conventional Near-Field Scanning Optical Microscopy.

20 Claims, 3 Drawing Sheets

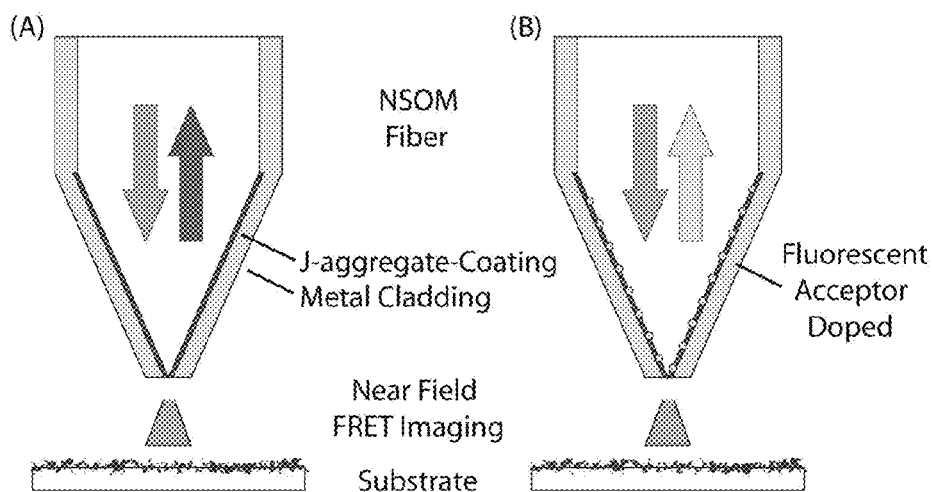
FIG. 3A  FIG. 3B
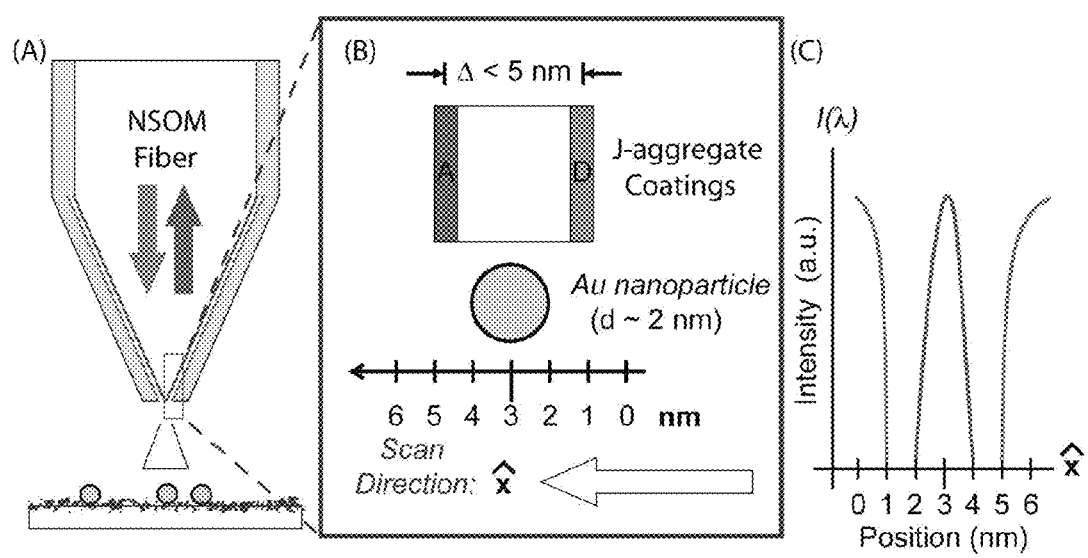
FIG. 4A  FIG. 4B  FIG. 4C

HIGH RESOLUTION NEAR FIELD SCANNING OPTICAL MICROSCOPY

CLAIM OF PRIORITY

This application claims priority under 35 USC 371 to International Application No. PCT/US2008/057426, filed on Mar. 19, 2008, which claims priority to U.S. Provisional Application Serial No. 60/895,875, filed on Mar. 20, 2007, each of which is incorporated by reference in its entirety.

FEDERALLY SPONSORED RESEARCH OR DEVELOPMENT

This invention was made with government support under Grant Number MDA972-00-1-0023, awarded by the Defense Advanced Research Project Agency. The government has certain rights to the invention.

TECHNICAL FIELD

The present invention relates to optical microscopy.

BACKGROUND

The resolution limit in traditional optical microscopy can be around 200 nm, which corresponds to the diffraction limit for visible wavelength light. To image features optically with resolution greater than 200 nm, evanescent near field interactions must be utilized. In Near Field Scanning Optical Microscopy (NSOM or SNOM), through collection of near field optical power, resolution of 50 nm can be readily achievable. In NSOM, a fiber drawn to a sharp tip with diameter less than 50 nm and coated with metal collects the near field optical power. With a more elaborate metal coated fiber, one containing a metal aperture covering a portion of the tip, lateral resolution of 20 nm is possible.

Another near-field based strategy to produce ultra-high resolution is an "apertureless near-field optical microscope", where a metal tip replaces the metal coated glass fiber tip of ordinary NSOM. In this approach, light coming from the sample is scattered by the tip and is then collected. An apertureless NSOM can be constructed from a standard atomic force microscope (AFM) where the cantilever tip of the AFM becomes the scattering point for the light probe. Resolution of up to 3 nm can be attained, and typically can be around 50 nm In order to improve the resolution of aperture and apertureless NSOM, researchers have investigated utilizing active tips that consist of isolated molecules or nanocrystals. These active probes can act as point dipole emitters or detectors that function with molecular resolution. However, to date the best reports show resolution limited to about 100 nm. This limit includes experiments utilizing Forster resonant energy transfer mechanisms.

SUMMARY

In general, in one aspect, an optical fiber can include a surface including a non-covalent multilayer including a light-absorbing material. In another aspect, a method of manufacturing an optical fiber includes forming a non-covalent multilayer including a light-absorbing material on a surface of an optical fiber. In another aspect, a method of forming an image of a sample includes monitoring light interacting with a sample, the light being transmitted or collected through an optical fiber including a surface including a non-covalent multilayer including a light-absorbing material.

The non-covalent multilayer can include a first layer interacting with a second layer via electrostatic interactions or hydrogen-bonding interactions, or combinations thereof. The non-covalent multilayer can cover a predetermined region of the surface. The non-covalent multilayer can include a multiply charged species. The multiply charged species can be a polyelectrolyte, for example, a polycation or a polyanion. The fiber can include a tapered tip. The fiber can include an apeture at a tip of the fiber. The surface can includes a metal layer, which can be adjacent to the non-covalent multilayer, overlap with the non-covalent multilayer, or combinations thereof. The non-covalent multilayer can include a fluorescent compound. The non-covalent multilayer can include a donor layer and an acceptor layer separated by a distance, which can be less than 5 nanometers. A portion of the non-covalent multilayer is crosslinked. The non-covalent multilayer can cover a predetermined region of the surface. The non-covalent multilayer can be formed on a tapered tip of the fiber. The light-absorbing material can include a J-aggregate, which can include a cyanine dye.

In the method of manufacturing, forming the non-covalent multilayer can include contacting the fiber with the light-absorbing material, contacting the substrate with a multiply charged species, depositing at least one layer of a polycation and at least one layer of a polyanion, depositing at least one layer of a polycation and at least one layer of the light-absorbing material, or combinations thereof. The method can include creating an apeture at a tip of the fiber. The method can include applying a metal layer to the surface and wherein the metal layer is adjacent to the non-covalent multilayer. The methods can include applying a metal layer to the surface that overlaps with the non-covalent multilayer. The method can include including a fluorescent compound in the non-covalent multilayer.

Advantageously, 5 nm resolution can be achieved in near field scanning optical microscopy applications using nanoscale thin films of J-aggregated cyanine dye. The film can have a high absorption coefficient. The film can have an absorption coefficient greater than $10^5$ cm$^{-1}$, for example, $10^6$ cm$^{-1}$ or larger. The films can be formed by adsorption into layered structures of charged species with strong dipole-dipole interactions between species. The films can be built by adsorption of species with alternating charge on a surface of a fiber, for example, a glass fiber.

Other features, objects, and advantages will be apparent from the description and drawings, and from the claims.

BRIEF DESCRIPTION OF DRAWINGS

FIGS. 3A and 3B are schematic drawings representing an optical fiber in which a J-aggregate coated metal cladding NSOM tip is utilized. (A) Nanoscale thick J-aggregate layer coated onto NSOM fiber, followed by Metal Cladding Layer. Metallically confined optical excitation and FRET collection with resolution set by J-aggregate layer thickness. (B) J-aggregate layer doped with FRET acceptor can shift collected emission to longer wavelength for more efficient collection.

FIGS. 4A and 4B are schematic drawings representing an optical fiber in which an active FRET NSOM tip includes 2 J-aggregate layers. (A) Donor (green) and Acceptor (red) layers of J-aggregate with inert spacer of optimized thickness coating NSOM fiber, followed by metal cladding for confine excitation and emission. (B) Inset of Donor (D) and Acceptor (A) layers in operation scanning a gold nanoparticle 2 nm in diameter. As the layers scan across the substrate, the nanoparticle mediates the FRET from Donor to Acceptor layer. FIG. 4C is a graph depicting intensity and wavelength varying as a function of tip position due to changes in FRET.

DETAILED DESCRIPTION

Figure 1A:
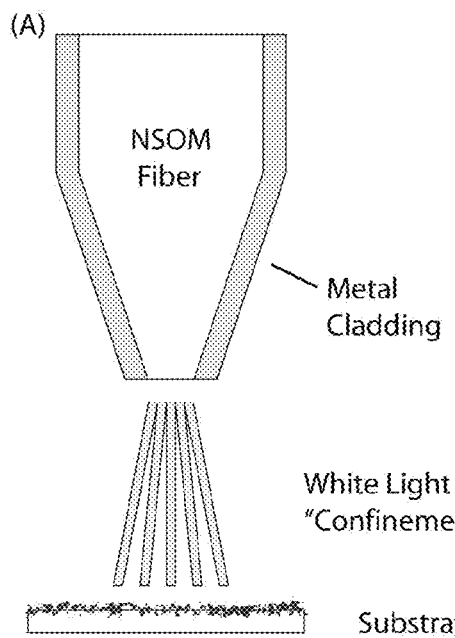
FIGS. 1A and 1B are schematic drawings representing an optical fiber in which metal is replaced with J-Aggregate Cladding Layer. (A) Typical Aperture NSOM tapered optical fiber with metal cladding over-layer. (B) Metal Cladding replaced by dip-coated thin film of J-Aggregate material provides greater optical confinement within a narrow-band of wavelengths.

The optical resolution limits of current chemical microscopy methods, to provide molecular-scale chemically specific mapping of surfaces. Current use of fluorescence to obtain chemical specificity is limited to a lateral spatial resolution of roughly 100 nm, which can impede identification of individual molecular species on a typical densely-packed substrate. An optical fiber including a surface including a non-covalent multilayer including a light-absorbing material can be used to develop fluorescence microscopy with a lateral resolution of about 5 nm and possibly lower. The non-covalent multilayer can be a highly absorptive thin film, for example a film based on J-aggregates, which can be used with conventional Near-Field Scanning Optical Microscopy. The high peak absorption constant of a J-aggregate film allows incident excitation energy to be concentrated in, for example, a 5 nm film. The film can transfer energy to a surface molecule of interest, generating a chemically-specific fluorescence signature for the surface species, which can be detected to generate an image. This technique can provide a general tool for probing chemical species on surfaces, enabling major advances in understanding chemical functionalities at the nanoscale. This understanding can in turn guide design, operation and field hardening of sensing and detection technologies that combine species specificity with high spatial resolution.

Films having a high oscillator strength (i.e., absorption coefficient) can be made by alternately adsorbing two or more materials capable of non-covalent interaction onto a support or substrate from solution, where one material is a light absorbing material, to form a non-covalent multilayer. The non-covalent interaction can be, for example, an electrostatic interaction, hydrogen bonding, or hydrophobic interactions. Selection of appropriate materials and assembly conditions can result in a film where the light absorbing material participates in strong dipole-dipole interactions, favoring a high absorption coefficient. The light absorbing material can be a dye capable of forming a J-aggregate. Once formed, components of the non-covalent multilayer can be cross-linked or otherwise covalently bonded.

A number of strategies for greatly extending the image resolution of current NSOM technologies by incorporating thin films of J-aggregated dye as layers coated on to the tip of a NSOM optical fiber. For example, it is possible to utilize J-aggregate films as a replacement of the metal layer that is typically used to confine light to the sub-diffraction limited dimensions of the NSOM. In another example, it is possible to utilize J-aggregate films as a FRET ruler integrated with a standard metallic cladding NSOM fibers. A single type of J-aggregating dye can be deposited, as well as doped films or multilayer films of varying thickness and composition. These layers can resolve optically active moieties with dimensions less than 5 nm films that are either photoluminescence or "dark", as in the case of metal nanoparticles. By leveraging the fundamental length scale for the dipole-dipole coupling amongst monomeric dyes that produces J-aggregate optical properties, it is possible to achieve sub 1 nm image resolution. For example, a J-aggregate based FRET NSOM strategy can be used in directly discerning the base pair sequence of suitably functionalized monomer dyes in a DNA strand of arbitrary length.

Layers of light absorbing material, which can be positively or negatively charged, can be interspersed with layers of an oppositely charged material. The oppositely charged material can include a multiply charged species. A multiply charged species can have a plurality of charge sites each bearing a partial, single, or multiple charge; or a single charge site bearing a multiple charge. A polyelectrolyte, for example, can have a plurality of charge sites each bearing a partial, single, or multiple charge. A polyelectrolyte has a backbone with a plurality of charged functional groups attached to the backbone. A polyelectrolyte can be polycationic or polyanionic. A polycation has a backbone with a plurality of positively charged functional groups attached to the backbone, for example poly(allylamine hydrochloride). A polyanion has a backbone with a plurality of negatively charged functional groups attached to the backbone, such as sulfonated polystyrene (SPS), polyacrylic acid, or a salt thereof. Some polyelectrolytes can lose their charge (i.e., become electrically neutral) depending on conditions such as pH. Some polyelectrolytes, such as copolymers, can include both polycationic segments and polyanionic segments. The charge density of a polyelectrolyte in aqueous solution can be pH insensitive (i.e., a strong polyelectrolyte) or pH sensitive (i.e., a weak polyelectrolyte). Without limitation, some exemplary polyelectrolytes are poly diallyldimethylammonium chloride (PDAC, a strong polycation), poly allylamine hydrochloride (PAH, a weak polycation), sulfonated polystyrene (SPS, a strong polyanion), and poly acrylic acid (PAA, a weak polyanion). Examples of a single charge site bearing a multiple charge include multiply charged metal ions, such as, without limitation, $Mg^{2+}$, $Ca^{2+}$, $Zn^{2+}$, $Fe^{2+}$, $Fe^{3+}$, $Co^{2+}$, $Cu^{2+}$, $Cd^{2+}$, $Sn^{4+}$, $Eu^{3+}$, $Tb^{3+}$, and the like. Multiply charged metal ions are available as salts, e.g. chloride salts such as $CoCl_2$, $FeCl_3$, $EuCl_3$, $TbCl_3$, $CdCl_2$, and $SnCl_4$.

The film can include hydrogen bonding polymers, such as, for example, polyacrylamide (PAm), polyvinylpyrolidone (PVP), and polyvinyl alcohol (PVA). The light absorbing film can include more than two materials. One of these materials is the light absorbing material and one of the other materials is either a multivalent ionic species or hydrogen bonding polymer. Additional materials may be included in the film to promote crosslinking, adhesion, or to sensitize light emission or absorption.

The thin films can include one or several layers of a polyelectrolyte and one or more charged species with strong dipole-dipole interactions and any additional dopants. At least one of the charged species used for strong dipole-dipole interactions has a charge opposite that of the polyelectrolyte used for the scaffold. When sequentially applied to a substrate, the oppositely charged materials attract forming a non-covalent bilayer. The polyelectrolyte provides a scaffold for the species with strong dipole-dipole interactions to form a layered structure. These films are compatible with other processes of building thin films through alternate adsorption of charged species. The films can be interspersed in a multifilm heterostructure with other thin films.

The charged species with strong dipole-dipole interactions can be a single type of species, such as a single type of J-aggregating material (for example, a cyanine dye). Alternatively, several charged species with strong dipole-dipole interactions among the species could be used. The species used for the strong dipole-dipole interacting layer can have individual dipoles that can couple together to produce a coherent quantum mechanical state. This allows for the buildup of coherence in two dimensions, producing effects in the probe dimension perpendicular to the interacting species.

J-aggregates of cyanine dyes have long been known for their strong fluorescence. This strong fluorescence makes J-aggregates a desirable candidate for use in organic light-emitting devices (OLEDs), and these devices have been demonstrated. The layer-by-layer (LBL) technique for film growth, first developed by Decher et al., was extended to create thin films of J-aggregates, which have been to create an OLED with J-aggregates as emitters. See, for example, E. E. Jelley, *Nature* 1936, 138, 1009; M. Era, C. Adachi, T. Tsutsui, S. Saito, *Chem. Phys. Lett.* 1991, 178, 488; G. Decher, J. D. Hong, J. Schmitt, *Thin Solid Films* 1992, 210, 831; H. Fukumoto, Y. Yonezawa, *Thin Solid Films* 1998, 329, 748; S. Bourbon, M. Y. Gao, S. Kirstein, *Synthetic Metals* 1999, 101, 152; Bradley, M.S. et al., *Advanced Materials* 2005, 17, 1881; and provisional U.S. patent application No. 60/624,187, filed Nov. 3, 2004, each of which is incorporated by reference in its entirety.

Layer-by-layer (LBL) processing of polyelectrolyte multilayers can be utilized to fabricate conformal thin film coatings with molecular level control over film thickness and chemistry. Charged polyelectrolytes can be assembled in a layer-by-layer fashion. In other words, positively- and negatively-charged polyelectrolytes can be alternately deposited on a substrate. One method of depositing the polyelectrolytes is to contact the substrate with an aqueous solution of polyelectrolyte at an appropriate pH. The pH can be chosen such that the polyelectrolyte is partially or weakly charged. The multilayer can include a number of non-covalent bilayers. An non-covalent bilayer is the structure formed by the ordered application of a multiply charged species (e.g., a polyelectrolyte or metal ion) and an oppositely charged material (e.g., a light absorbing material, polyelectrolyte or counterion). The properties of weakly charged polyelectrolytes can be precisely controlled by changes in pH. See, for example, G. Decher, Science 1997, 277, 1232; Mendelsohn et al., Langmuir 2000, 16, 5017; Fery et al., Langmuir 2001, 17, 3779; Shiratori et al., Macromolecules 2000, 33, 4213, each of which is incorporated by reference in its entirety.

The process conditions used in the deposition of the film can be varied. Some process conditions that can be varied include concentration, temperature, pH, salt concentration, co-solvent, co-solvent concentration, and deposition time. The temperature can be varied between, for example, 0° C. and 100° C., or between 5° C. and 80° C. The pH can be varied from 0.0 to 14.0, or from 3.0 to 13.0. The salt concentration can range from deionized (i.e., no salt added) to 1 M. NaCl and KCl are examples of salts used. Solutions can be prepared using water as the sole solvent, or with water and a co-solvent, such as an organic solvent. Some exemplary organic solvents include methanol, ethanol, isopropanol, acetone, acetic acid, THF, dioxane, DMF, and formamide The deposition time can be 1 second or less; 30 seconds or less; 1 minute or less; 5 minutes or less; 10 minutes or less; 1 hour or less; or several hours or more. In some circumstances, deposition times will be in the range of 1 second to 10 minutes.

The density of the film can be modified by repeatedly immersing the substrate into solutions of the light absorbing material prepared with different process conditions. As an example, by cyclically immersing into a solution held at a temperature of 20° C. and then in a second solution held at 60° C. The crystallinity of the resultant film is enhanced and dye density increased compared to films not treated in this manner.

The film can include a plurality of bilayers, such as fewer than 100, fewer than 50, fewer than 20, or fewer than 10 bilayers. The film can include 0.5, 1.0, 1.5, 2.0, 2.5, 3.0, 3.5, 4.0, 4.5, 5.0, 5.5., 6.0, 6.5, 7.0, 7.5, 8.0, 8.5, 9.0, 9.5, or 10.0 bilayers. A bilayer includes a layer of multiply charged material and a layer of light absorbing material. In some embodiments, the film can include bilayers substantially free of light absorbing material, e.g., bilayers where one layer includes a polycation and the other layer includes a polyanion. Including bilayers that are substantially free of light absorbing material can be advantageous, for example, in altering the adhesion of the film to a substrate or in altering the thickness of the film. The thickness of the layer can be controlled by modifying the dipping conditions and the number of bilayers in the film.

The light absorbing film can be deposited on a hydrophilic or hydrophobic substrate. The film can be deposited onto conducting (e.g., metallic), semiconducting, or insulating layers; or bio-compatible materials, examples of which are a polymer film that is hydrophilic or hydrophobic, an oxide layer, a metal oxide layer, a metal layer, a DNA-coated surface, and others. Examples of a hydrophilic polymer layer include polyelectrolytes and hydrogen bonding polymers; amino acids; proteins; and hydrophilic polymers. Examples of hydrophobic polymers include PDMS, Poly-TPD, and MEH-PPV. Metal oxide layers include, for example alumina, titania, and zinc oxide. Examples of semiconducting layers are layers of Si, Ge, GaAs, GaN, AlGaAs, GaAsP, CdSe, CdS, ZnS, and metal halides, such as AgCl, AgBr, and AgI. Adhesion of the light absorbing film to the substrate can be promoted by varying the process conditions described above.

High oscillator strength thin films, methods of making such films, and optical properties of such films are described in U.S. patent application Ser. No. 11/265,109, filed Nov. 3, 2005, which is incorporated by reference in its entirety. The layer-by-layer deposition process can conveniently coat a substrate. Forming patterns of deposited material with layer-by-layer processing can be more difficult. Advantageously, layer-by-layer processing can be combined with microcontact printing to apply a pattern of layer-by-layer type materials (e.g., polyelectrolyte multilayers, high oscillator strength thin films, and the like) to a substrate.

The J-aggregating cyanine dye can be the anion TDBC (5,6-dichloro-2-[3-[5,6-dichloro -1-ethyl-3-(3-sulfopropyl)-2(3H)-benzimidazolidene]-1-propenyl]-1-ethyl-3-(3-sulfo-propyl) benzimidazolium hydroxide, inner salt, sodium salt). Other dyes can be used. The choice of cationic material used with TDBC in the film can determine how the film is prepared. For example, poly(allyldimethylammonium chloride)

(PDAC) can be used in a manner similar to that previously described for J-aggregate thin films grown on glass. See M. S. Bradley, J. R. Tischler, V. Bulovic, *Adv. Mater.* 2005, 17, 1881, which is incorporated by reference in its entirety. Alternatively, poly(allylamine hydrochloride) (PAH), poly(sodium-4-styrene sulfonate) (PSS) can be used. TDBC can be obtained from Nippon Kankoh Shikiso Kenkyusho Co., Ltd. (CAS 28272-54-0). Polyelectrolytes PDAC, poly(diallyldimethylammonium chloride), 35% by weight in water, $M_w$<100,000 (CAS 26062-79-3); PSS, poly(sodium-4-styrenesulfonate), $M_w$~1,000,000 (CAS 25704-18-1); and PAH, poly(allylamine hydrochloride), $M_w$~70,000 (CAS 71550-12-4) can be obtained from Sigma-Aldrich.

A standardized routine can be used to prepare the dye and polyelectrolyte solutions. The dye solution can be, for example, approximately $5\times10^{-5}$ M. Once the dye was added to the dye solvent, the dye bucket can be sonicated in an ultrasonic bath. The dye can be mixed and sonicated multiple times. The polyelectrolyte solutions can be, for example, approximately $3\times10^{-2}$ M, measuring by monomeric units. The polyelectrolyte solutions can be prepared using the same time intervals for mixing/sonication as the dye solution preparation, except sonication and mixing steps can be interchanged. Care can be taken throughout the deposition to shield the dye solution and samples from light.

Prior to deposition of PDAC/TDBC films, the fiber can be pretreated with oxygen plasma. The cation adsorption step can include dipping the fiber into a cationic solution and rising. The anion adsorption step can include dipping the fiber into an anionic solution. After the pretreatment, the stamps can undergo varying numbers of SICAS of PDAC and TDBC to build the J-aggregate thin films. After LBL growth is complete, the films can be dried using a stream of nitrogen gas.

The dye solvent and rinses for the dye adsorption step can be deionized (DI) water with pH of 5 to 5.5. The effect of pH on TDBC has been previously documented (see I. A. Struganova, et al., *J. Phys. Chem. B* 2002, 106, 11047, which is incorporated by reference in its entirety). Except for the PAH solvent, the polyelectrolyte solvents and rinses for the polyelectrolyte adsorption step can be DI water. The PAH solvent can be DI water plus 0.01 M sodium chloride, and the pH of the solvent can be raised to between 7 and 8 using sodium hydroxide. Sodium chloride can be AR-brand from Mallinckrodt. Sodium hydroxide can be obtained from EM Science.

The use of other polyelectrolytes for growing J-aggregates in solution has been studied extensively, and combined with recent work by Park et al. in studying the growth of LBL polyelectrolyte thin films on hydrophobic surfaces, these studies suggest that stamped LBL J-aggregate thin films using various dyes could be achieved through variation of the polyelectrolyte and growth conditions. See, for example, C. Peyratout, L. Daehne, *Phys. Chem. Chem. Phys.* 2002, 4, 3032, C. Peyratout, E. Donath, L. Daehne, *J. Photochem. Photobiol. A-Chem.* 2001, 142,51, C. Peyratout, E. Donath, L. Daehne, *Photochem. Photobiol. Sci.* 2002, 1, 87, E. Rousseau, M. Van der Auweraer, F. C. De Schryver, *Langmuir* 2000, 16, 8865, E. Rousseau, M. M. Koetse, M. Van der Auweraer, F. C. De Schryver, *Photochem. Photobiol. Sci.* 2002, 1, 395, and J. Park, P. T. Hammond, *Macromolecules* 2005, 38, 10542, each of which is incorporated by reference in its entirety.

To achieve improved resolution, the unique optical properties of nanoscale thin films of J-aggregate cyanine dyes can be leveraged. Nano-scale films of J-aggregate dyes are highly reflective layers with high fluorescent quantum yield that can efficiently participate in Forster energy transfer and optical absorption and emission processes. In aperture NSOM, these films can be integrated with metal coated fibers or replace the metal as the mode confinement layer material. They can also be implemented in an Apertureless NSOM type approach utilizing the energy transfer characteristics of the J-aggregate thin films.

For example, a fiber probe having an aperture for use in near-field scanning optical microscopy can be prepared by coating an optical fiber having a tapered tip with a metal layer. The tapered tip can be formed with a heating-pulling process, an etching process, or combinations thereof. The coated metal layer can be, for example, an aluminum, gold, or chromium layer. The metal layer can be a sputtered layer having a thickness of less than 150 nanometers, less than 125 nanometers, less than 100 nanometers, greater than 10 nanometers, greater than 25 nanometers, greater than 50 nanometers, or greater than 75 nanometers. The metal layer can be deposited on a selected region of the fiber, or over a non-covalent multilayer, or combinations thereof.

The fiber can have an aperture. Once the optical fiber is coated with the metal layer, the tip can be milled to form an aperture through the metal layer at the tapered tip. The aperture can have a predetermined diameter, which can be less than a wavelength of light used in the near-field scanning optical microscopy, for example, 100 nanometers, 80 nanometers, 60 nanometers, 50 nanometers or less.

The fiber can be apertureless. The optical fiber and the metal layer can be co-extensive to a terminal end of a tapered tip.

Figure 1B:
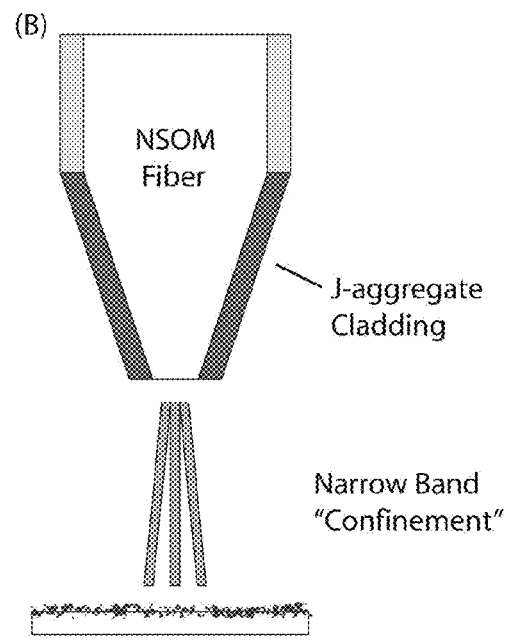

In aperture NSOM, light at the tip of the fiber can be confined laterally to dimensions less than 200 nm by a metal layer cladding the tapered optical fiber. See, for example, FIG. 1A. Because of this confinement, light must evanescently tunnel through this region of fiber in order to reach the sample. In one embodiment, it is possible to replace the metal cladding, which typically can be a thermally evaporated aluminum layer, with a dip-coated film of J-aggregate materials. See, for example, FIG. 1B. Within a narrow wavelength band centered at the optical resonance of the J-aggregate, a film of J-aggregates can possess a larger extinction coefficient than metal. Hence, it is possible to confine light laterally to a smaller area than with metal. To fabricate such a coating, the metal coating on a standard aperture NSOM fiber can be etched off the tip followed by dip-coating of the dye film. Operationally, the J-aggregate coated fiber could be used for narrowband excitation and or narrowband collection.

Figure 2A:
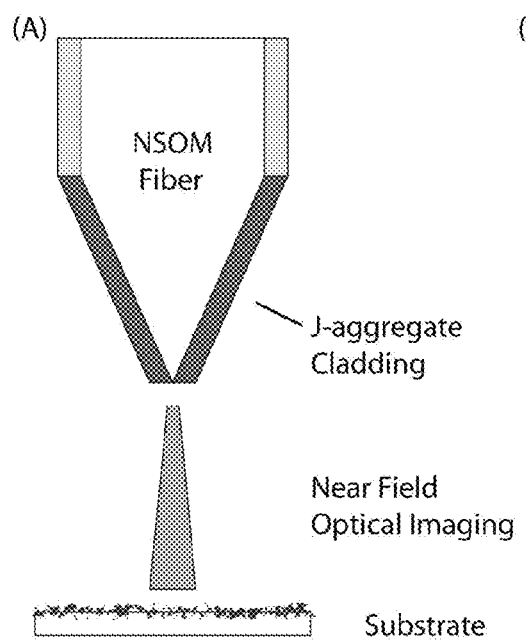
FIGS. 2A and 2B are schematic drawings representing an optical fiber in which resonant optical tunneling through a J-aggregate cladding can be utilized. (A) J-aggregate layer can be thinner near tip of fiber, permitting resonant light to penetrate through this narrowly confined region. (B) Same structure operating via Forster Resonant Energy Transfer (FRET), whereby localized dipole-dipole coupling induces transmission of energy across the J-aggregate layer.
Figure 2B:
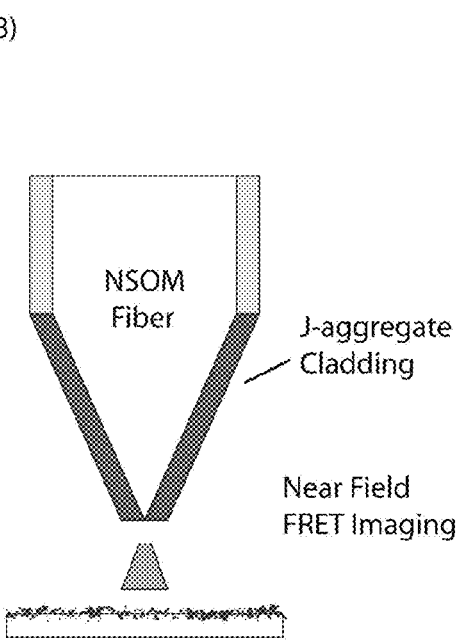

In another embodiment, aperture NSOM can utilize J-aggregates as a replacement for the metal cladding layer can use a narrower fiber tip with the J-aggregate film covering the entire tip of the fiber. See, for example, FIG. 2A. In this case, light can be more effectively confined to the center of the fiber tip, where the J-aggregate film can be thinnest. In FIG. 2B, this same tip can be operated as a Forster Resonant Energy Transfer (FRET) probe, whereby localized dipole-dipole coupling induces transmission of energy across the J-aggregate layer. In this way, the strongly non-linear spatial dependence of the FRET process can be utilized to boost lateral resolution. However, this latter approach may suffer a decrease in lateral resolution because optical excitation at the fiber tip may spread via exciton diffusion to regions of the J-aggregate film further away from the center of the tip. Operationally, the J-aggregate coated fiber can be used for narrowband excitation and or narrowband collection.

In another embodiment, instead of replacing the metal layer, nanoscale thin films of J-aggregates can be integrated with the standard metal confinement layer of aperture NSOM, to produce greater FRET resolution. See, for example, FIG. 3A. In this approach, the J-aggregate layer can be only several nanometers thick. By itself, it cannot confine the light to the narrow lateral dimensions of the NSOM fiber; this function is accomplished by a metal layer positioned over the J-aggregate layer. The J-aggregate layer can act as a nanometer thin antenna for inducing FRET with optically active compounds on the substrate. For example, it can serve as the FRET donor layer, with emission being collected evanescently through the center of the fiber or back through the J-aggregate film. Alternatively, it can serve as the FRET acceptor layer, with optical excitation from the fiber tip. To construct such a compound tip, first the J-aggregate film can be deposited onto the end of the fiber via dip-coating, followed by deposition of the metal layer using standard procedures. By optimizing the thickness of the J-aggregate layer, it can be possible to utilize exciton—plasmon polariton effects to boost field strength at the tip at the J-aggregate layer. Furthermore, the J-aggregate film, if it is being used as the FRET acceptor layer, can be doped (~1% concentration) with a second acceptor fluorescent compound to permit efficient collection of the FRET energy up through the fiber. See, for example, FIG. 3B.

In another embodiment, the thin J-aggregate film can be composed of two J-aggregate layers that act as a FRET pair, separated at a fixed distance by an optically inert spacer layer. See, for example, FIG. 4A. In this way, the optically active moiety that is being imaged can mediate the energy transfer process between the two layers. This embodiment can be suitable, for example, for near-field imaging non-photoluminescent metal nanoparticles with with diameter less than 5 nm, thus giving such an NSOM a resolution better than 5 nm An advantage of this approach can be that by adjusting the separation between the J-aggregate donor and acceptor layers, the FRET resolution can be modulated with out changing the aperture dimensions of the fiber tip. Advantageously, the ability to deposit the J-aggregate layers uniformly with nanometer precision permits such structures to be created. By measuring the wavelength and intensity of the collected light, the size of the nanoparticle can be discerned for a given FRET transfer function. The FRET transfer function can be determined through calibration of the tip using nanoparticles or metal nano-features of known size.

Figure 5A:
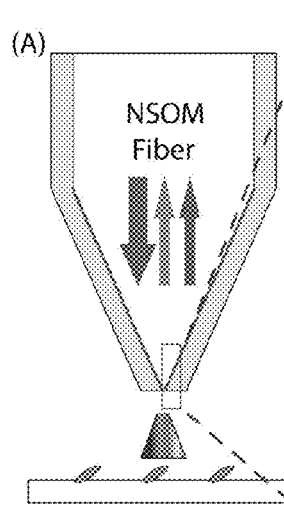
FIGS. 5A and 5B are schematic drawings representing an optical fiber in which FRET NSOM utilizes J-aggregating dye in monomeric form as a sub 1 nm FRET ruler. (A) Monomer functionalized to the substrate is scanned with the FRET NSOM tip used in Strategy III. (B) Inset of Scan on dye monomer which possesses a long dimension of about 1 nm and narrow dimension of 0.3 nm
Figure 5B:
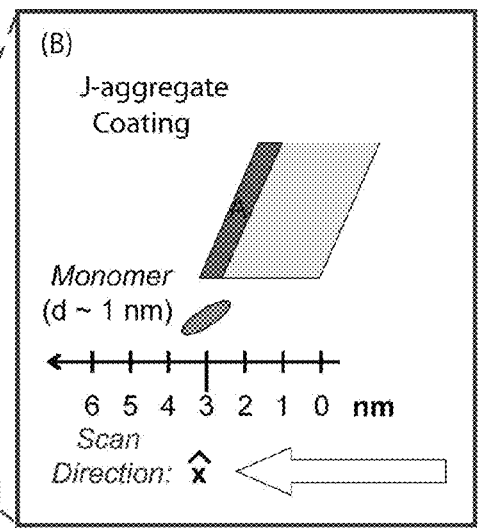
Figure 5C:
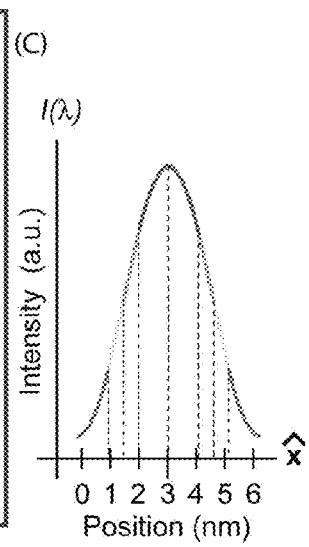
FIG. 5C is a graph depicting intensity and wavelength as a function of position near the monomer. As position is scanned, the collected light should change wavelength, intensity, and lifetime as monomer transitions from isolation, to FRET pair donor, to J-aggregated dye.

In other embodiments, the length-scale for the dipole-dipole interactions that can manifest the formation of J-aggregates can be utilized to achieve sub 1 nm resolution. See, for example, FIG. 5A. Without intending to be bound by any particular theory, monomers can become a part of a J-aggregate only when they are less than 1 nm from the rest of the J-aggregate. Therefore, by measuring the emission and lifetime of monomers dispersed on a substrate with a J-aggregate film incorporated into the NSOM tip as a FRET acceptor (see, for example, FIGS. 3A and 3B), it can be possible to discern whether the monomer is simply participating in FRET transfer or is in fact becoming J-aggregated with the film on the NSOM tip. See, for example, FIG. 5C. As position is scanned, the collected fluorescent light can change wavelength, intensity, and lifetime as monomer transitions from isolation, to FRET pair donor, to J-aggregated dye in a manner that would provide sub-nanometer resolution. Operationally, overcoating moieties with monomeric J-aggregating dye can produce isolated markers for this ruler and the shift from monomer to J-aggregate can be tracked and utilized to as a sub-nanometer probe of position. If these monomers are chemically functionalized, for example, to a specific base pair of a DNA sequence, then this approach could serve as the foundation for directly-sequencing the base sequence of a DNA strand, given non-monomer labeled bases are suitably treated or functionalized by other moieties.

Other embodiments are within the scope of the following claims.

What is claimed is:

1. An optical fiber comprising a surface including a non-covalent multilayer including a light-absorbing material, wherein the light-absorbing material includes a J-aggregate, wherein the surface further includes a metal layer, wherein the metal layer overlaps with the non-covalent multilayer, and wherein the non-covalent multilayer includes a light donor layer and a light acceptor layer separated by a distance.

2. The optical fiber of claim 1, wherein the non-covalent multilayer covers a predetermined region of the surface.

3. The optical fiber of claim 1, wherein the J-aggregate includes a cyanine dye.

4. The optical fiber of claim 1, wherein the non-covalent multilayer includes a multiply charged species.

5. The optical fiber of claim 4, wherein the multiply charged species is a polyelectrolyte.

6. The optical fiber of claim 1, wherein the non-covalent multilayer has an absorption coefficient of at least $1 \times 10^5$ cm$^{-1}$.

7. The optical fiber of claim 1, wherein the non-covalent multilayer has an absorption coefficient of at least $5 \times 10^5$ cm$^{-1}$.

8. The optical fiber of claim 1, wherein the non-covalent multilayer has an absorption coefficient of at least $1 \times 10^6$ cm$^{-1}$.

9. The optical fiber of claim 1, wherein the fiber includes a tapered tip.

10. The optical fiber of claim 1, wherein the fiber includes an aperture at a tip of the fiber.

11. The optical fiber of claim 1, wherein the metal layer is adjacent to the non-covalent multilayer.

12. The optical fiber of claim 1, wherein the non-covalent multilayer includes a fluorescent compound.

13. The optical fiber of claim 1, wherein the distance is less than 5 nanometers.

14. The optical fiber of claim 1, wherein a portion of the non-covalent multilayer is crosslinked.

15. A method of manufacturing an optical fiber comprising:
forming a non-covalent multilayer including a light-absorbing material on a surface of an optical fiber, wherein forming the non-covalent multilayer includes contacting the fiber with the light-absorbing material and wherein the light-absorbing material is a J-aggregate, wherein the non-covalent multilayer includes a light donor layer and a light acceptor layer separated by a distance.

16. The method of claim 15, wherein the non-covalent multilayer includes a first layer interacting with a second layer via electrostatic interactions.

17. The optical fiber of claim 15, wherein the non-covalent multilayer includes a first layer interacting with a second layer via hydrogen-bonding interactions.

18. The optical fiber of claim 15, wherein forming the non-covalent multilayer includes contacting the substrate with a multiply charged species.

19. A method of forming an image of a sample comprising monitoring light interacting with a sample, the light being transmitted or collected through an optical fiber of claim 1.

20. The method of claim 19, wherein the image identifies features having a dimension of 5 nanometers or less.

* * * * *